United States Patent [19]

Smetana et al.

[11] Patent Number: 5,114,617

[45] Date of Patent: May 19, 1992

[54] HIGH STRENGTH STRUCTURAL PERLITE CONCRETE

[75] Inventors: David A. Smetana, Cleveland Heights, Ohio; R. Steve Williams, Nashville, Tenn.

[73] Assignee: Advanced Concrete Technology, Inc., Cleveland Heights, Ohio

[21] Appl. No.: 571,549

[22] PCT Filed: May 18, 1990

[86] PCT No.: PCT/US90/02759

§ 371 Date: Aug. 24, 1990

§ 102(e) Date: Aug. 24, 1990

[87] PCT Pub. No.: WO90/14319

PCT Pub. Date: Nov. 29, 1990

Related U.S. Application Data

[63] Continuation-in-part of Ser. No. 354,829, May 22, 1989, abandoned, and a continuation-in-part of Ser. No. 418,326, Oct. 6, 1989.

[51] Int. Cl.$^5$ .................. C04B 14/18; C04B 20/06
[52] U.S. Cl. .................. 252/378 P; 106/675; 106/698; 106/DIG. 2
[58] Field of Search ............ 252/378 P; 106/DIG. 2, 106/675, 698

[56] References Cited

U.S. PATENT DOCUMENTS

| | | | |
|---|---|---|---|
| 2,572,483 | 10/1951 | Howle | 252/378 P |
| 2,585,366 | 2/1952 | Bollaert et al. | 106/98 |
| 3,100,715 | 8/1963 | Leonard | 106/675 |
| 4,518,431 | 5/1985 | Duvier, Jr. | 106/DIG. 2 |
| 4,889,747 | 12/1989 | Wilson | 106/DIG. 2 |

FOREIGN PATENT DOCUMENTS 913373 12/1962 United Kingdom ............ 252/378 P

*Primary Examiner*—Mark L. Bell
*Assistant Examiner*—Deborah Jones
*Attorney, Agent, or Firm*—Pearne, Gordon, McCoy & Granger

[57] ABSTRACT

A high strength concrete particularly useful for precast, prestressed products comprising by weight of the wet concrete mix, 8 to 60 percent cement, 0.5 to 20 percent smooth-surfaced, vesicular, expanded perlite, 5 to 30 percent water, 0 to 12 percent pozzolan, and fine aggregate and coarse aggregate as appropriate and available in the circumstances. The concrete provides superior bond to reinforcing strands. The smooth-surfaced, vesicular, expanded perlite is unique and novel.

21 Claims, 3 Drawing Sheets

HIGH STRENGTH STRUCTURAL PERLITE CONCRETE

REFERENCE TO RELATED APPLICATIONS

This application is a continuation-in-part of application Ser. No. 07/354,829, filed May 22, 1989, now abandoned, and application Ser. No. 07/418,326, filed Oct. 6, 1989.

BACKGROUND OF THE INVENTION

The present invention relates to the addition of a novel, relatively smooth-surfaced, vesicular, expanded perlite to cement to make high-strength cementitious compositions for the manufacture of structural concrete, particularly precast, prestressed, strand-reinforced products such as planks for use in the construction industry. It also relates to the novel expanded perlite itself.

OBJECTS OF THE INVENTION

It is an object of this invention to provide a cementitious compound which, when added to aggregate and combined with water, provides strong, stiff, high-strength structural concrete.

It is another object of this invention to provide a cementitious composition for reinforced precast concrete products such as plank stock which improves the adhesion between the reinforcing strands and the concrete while retaining all of the above characteristics of the concrete.

Other objects and advantages will become apparent from the following description of the invention.

SUMMARY OF THE INVENTION

In accordance with our invention, we add a novel, relatively smooth-surfaced, vesicular, expanded perlite to the cementitious mixture. The expanded perlite is of relatively small particle size, 100 to 30 mesh, or smaller, and is generally spherical in shape. The expanded perlite is of relatively low density so that the resultant concrete may be lightweight and strong, and may have zero to low slump so that it can be cast into plank stock or the like. The bond between the concrete and the reinforcing strands is much improved.

DETAILED DESCRIPTION OF THE PREFERRED EMBODIMENT

Figure 1:
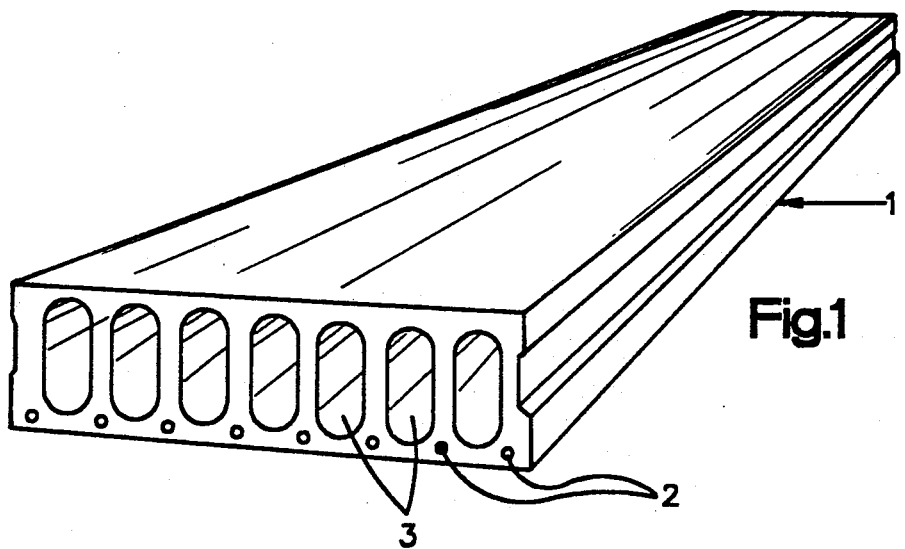
FIG. 1 is a perspective view of a typical plank, such as is manufactured by members of the Spancrete Manufacturer's Association.

FIG. 1 shows a length of hollow core plank stock 1 with reinforcing strands 2 in the bottom portion thereof. Voids 3 are formed in the central portion of the plank stock in order to reduce weight.

It is now standard practice to cast a length of such hollow core plank stock 1 in a casting bed. One prevalent method is the use of a machine which moves at from 8 to 15 feet (2.4 to 4.5 m) per minute along the bed and deposits or casts the concrete over and around reinforcing steel strands which are prestressed and in tension. The concrete is formulated to have zero to low slump and high strength. The concrete is allowed to remain on the bed until it has set-up enough to have a compressive strength of at least 3000 psi (20.69 Millipascals - MPa) and has become adherent to the reinforcing strands. It is then sawed into predetermined lengths and moved to a storage yard for final curing. The plank stock 1 can be up to 500 feet (154 m) long. The lengths of the planks or spans cut from the plank stock can be 10 to 30 feet (3 to 9 m) long. The plank stock 1 can be from about 3 feet (1 m) up to 8 feet (2.4 m) wide and from 6 inches (15 cm) up to about 18 inches (46 cm) thick.

This is a continuous process in which the plank stock is cast in three layers, all in a single pass, with the middle mix being tamped in around oscillating cores in order to form hollows or voids 3 in the plank stock 1.

In order for the reinforcing strands 2 to be effective, the concrete must adhere to them. Other considerations in the formulation of the concrete for the planks are stiffness and light weight, both of which are desired, and, of course, cost. A group of companies, called the Spancrete Manufacturers Association, manufacture such planks, among others.

While concrete planks and concrete compositions for the manufacture of planks are the products with which we are presently concerned, the cementitious composition of the present invention has application to many other products, as will be hereinafter described.

Figure 2A:
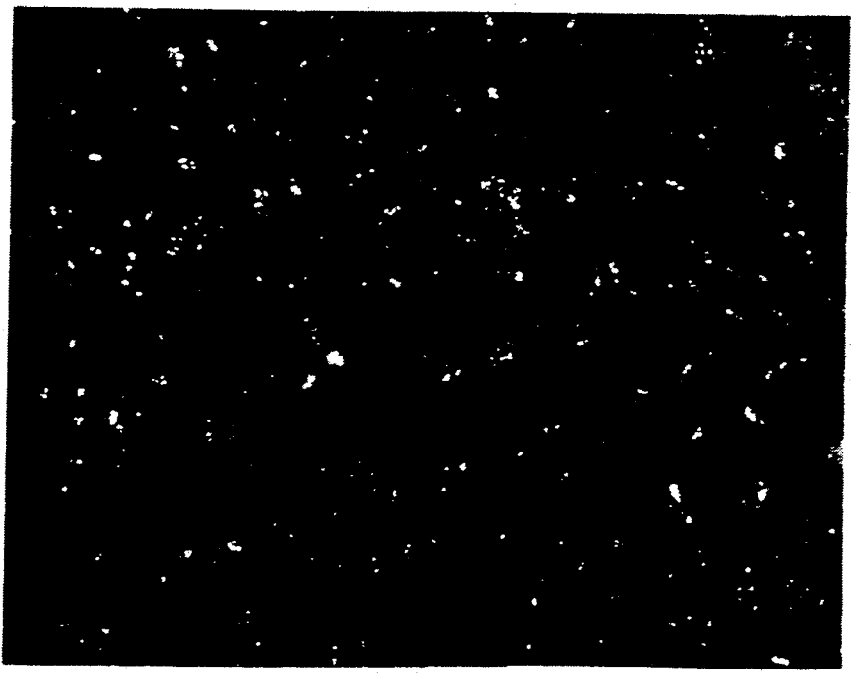
FIGS. 2A and 2B are photomicrographs at 17 times magnification and 100 times magnification, respectively, of the expanded perlite as manufactured and processed for use in accordance with the present invention.
Figure 2B:

The cementitious composition of the present invention contains, based on the wet concrete mix, from about 0.5 to 20 percent by weight of a relatively smooth-surfaced, vesicular, expanded perlite of from about 100 to 30 mesh in size, with a bulk density of from about 7 to 20 pounds per cubic foot (112 to 320 kg/m$^3$). As shown in the photomicrographs of FIGS. 2A and 2B, the expanded perlite of this invention is rounded or spherical and smooth on its surface, and is of fairly uniform size. It is relatively hard and not friable. It does not disintegrate when used as an aggregate and mixed with cement and other aggregates.

In order to understand the significance of our invention and the role of its constituent elements, it is necessary to define and identify the types of expanded perlite which are in the prior art and the expanded perlite of our invention. Perlite mineral is a volcanic silica glass containing entrapped water which, when subjected to heat in the expanding process, causes the silica walls of the perlite ore to soften while the entrapped water expands, creating a multitude of cells or voids which increase the size of the particle significantly. Perlite ore expands four to twenty times its original volume.

Expanded perlite can be classified into four distinct types: shattered fragment perlite; individual spherical cell perlite; open-surfaced, expanded perlite; and smooth-surfaced, expanded perlite. The first three types represent prior art perlite and the fourth constitutes the expanded perlite of our invention.

Shattered fragment perlite consists of minute solid particles of perlite comprised primarily of fragments of broken cell wall, which have a specific gravity of about 2.3 and sink in water. These "shattered fragments" are generated in the process of expanding the perlite ore wherein the perlite ore is overheated, causing the cell walls to burst, forming broken or shattered solid pieces. This type of perlite is referenced in U.S. Pat. No. 2,585,366.

Individual spherical cell perlite is perlite that has a single, hollow, spherical cell with a thin, glassy wall. This material is generally quite small in size and is a product of either the expansion of extremely fine particles of perlite ore or the degradation of the larger open-surfaced cell, expanded perlite. It is available commercially under the trademark DICAPERL from Grefco, Inc., of Los Angeles, Calif. It is characterized as being hollow glass microspheres. It is relatively expensive because the expanded perlite has to be screened through sieves in order to obtain this product.

Open-surfaced, expanded perlite is an expanded perlite with a vesicular structure consisting of numerous polygonal cells with internal cells that are closed or sealed and external surface cells that are open. This type of expanded particle ranges in size from 50 to 10 mesh, but is generally 30-mesh or larger. This open-surfaced perlite tends to be angular in shape and quite friable. The fragmented external cell walls of this type of perlite are referred to in the industry as "rabbit ears." Rabbit ears tend to break off from the larger perlite pieces and form shattered fragment perlite. The open-surfaced, expanded perlite particles have a bulk density of 2 to 7 pounds per cubic foot (32 to 112 kg/m$^3$). These particles float in water, but they are not as buoyant as smooth-surfaced, expanded bubble perlite because of their open surface cells.

Smooth-surfaced, vesicular, expanded perlite is an expanded perlite consisting of numerous polygonal cells with both the internal and external surface cells, for the most part, being closed. The cell walls of the perlite are relatively thick compared to the size of the interior voids. This smooth-surfaced perlite is rounded and generally spherical in shape. This perlite floats on water and is more buoyant than open-surfaced, expanded perlite because of its rounded shape, and because its surface is smooth and, for the most part, closed. It does not have rabbit ears, is relatively non-friable, and it imparts significant structural characteristics to mixtures with other compounds. The expanded perlite of our invention is from 100 to 30 mesh in size and should have a bulk density of from 3 to 20 pounds per cubic foot (48 to 320 kg/m$^3$) and, preferably, from 8 to 15 pounds per cubic foot (128 to 240 kg/m$^3$). At least about 90% by weight is retained on a 100 mesh screen. Chemical analysis of this perlite shows a silicon dioxide content of over 70%.

As shown in the photomicrographs of FIGS. 2A and 2B, the special perlite for use in our invention is rounded with a smooth surface, and is of a fairly uniform size. It is also relatively hard and not friable. This shape, size and non-friability impart significant attributes to concrete by allowing a uniform mix of product which stays blended, does not degrade, and has significantly less void space than prior art perlite.

Figure 3A:
FIGS. 3A and 3B are photomicrographs at 17 times magnification and 30 times magnification, respectively, of the prior art expanded perlite which is added to concrete to manufacture relatively low-density and low-strength insulating concrete for roofs of buildings.
Figure 3B:
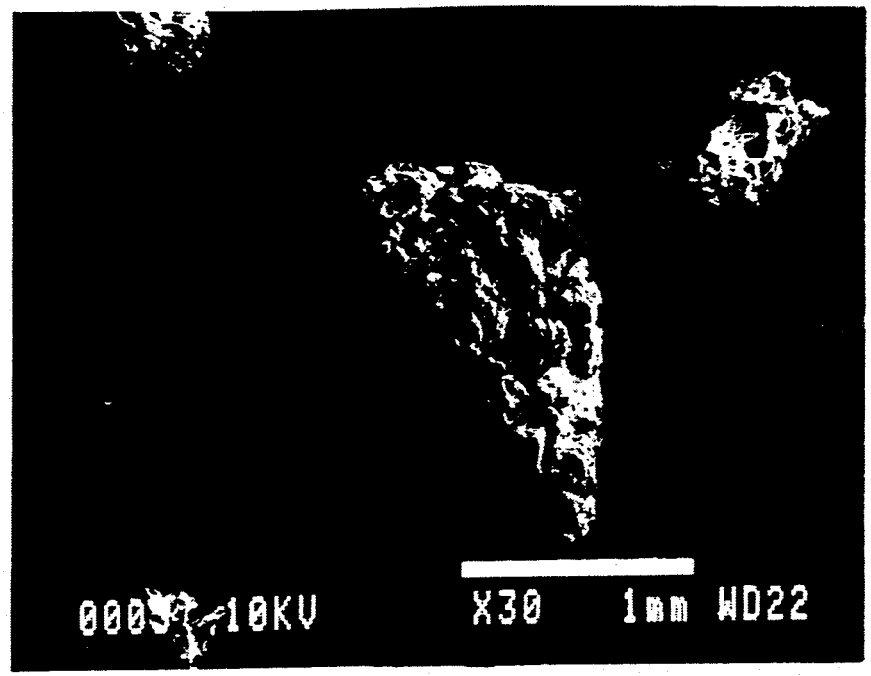

FIGS. 3A and 3B show the open-surfaced prior art perlite. The particles are rough, sharp and uneven in size. The prior art perlite particles are larger than the perlite for use in our invention, and for that reason, FIG. 2B is 100 times magnification, whereas FIG. 3B is only 30 times magnification.

For purposes of our invention, we call this new type of perlite "smooth surfaced, vesicular, expanded perlite."

A key characteristic of the expanded perlite of our invention is that it does not segregate when blended and shipped with other dry materials, and it resists degradation when blended with other materials. This result is in contrast to the performance of the prior art expanded perlite such as shown in FIGS. 3A and 3B, which tends to segregate and degrade when mixed with other materials.

Suitable perlite ore for processing into the special expanded perlite for use in our invention may be obtained from Grefco, Inc., P.O. Box 308, Antonito, Colo. 81120, grades NA 66 (fines), NA 67 (fines) or SOC 65 (fines). Another source of suitable ore is Manville Corp., Antonito, Colo. The specifications for the Grefco NA 66, NA 67, and SOC 65 ores, by weight are:

TABLE 1

| U.S. Standard Sieve No. | NA 66 % | NA 67 % | SOC 65 % |
|---|---|---|---|
| 50 (.3 mm) | 8 | 22 | 5 |
| 100 (.15 mm) | 53 | 58 | 70 |
| 200 (.075 mm) | 32 | 15 | 20 |
| Pan | 7 | 5 | 5 |
| Total | 100 | 100 | 100 |

The overall specifications for these grades of ore, or a perlite ore grade suitable for use for expansion into our special perlite by weight, are:

TABLE 2

| U.S. Standard Sieve No. | Cumulative and Minimum % | Retained Maximum % | Typical |
|---|---|---|---|
| 50 (.3 mm) | 0 | 22 | 10 |
| 100 (.15 mm) | 40 | 90 | 59 |
| 200 (.075 mm) | 85 | 100 | 93 |

Examples of corresponding specifications by weight for our special perlite expanded from the above preferred specified Grefco ores are as follows:

TABLE 3

| Ore Type Bulk Density of Expanded Perlite Pounds per cubic foot (Kilograms per cubic meter) | NA 66 | NA 67 | SOC 65 |
|---|---|---|---|
| Uncompacted | 3.40 (54) | 8.77 (140) | 12.35 (198) |
| Compacted | 4.25 (68) | 9.85 (158) | 13.58 (217) |
| U.S. Standard Sieve No. | % | % | % |
| 16 (1.18 mm) | 0.3 | Trace | Trace |
| 30 (.6 mm) | 21.3 | 11.2 | 2.0 |
| 50 (.3 mm) | 46.6 | 63.0 | 72.4 |
| 100 (.15 mm) | 23.4 | 18.3 | 20.4 |
| Pan | 8.4 | 7.5 | 5.2 |
| Total | 100.0 | 100.0 | 100.0 |

The overall specifications by weight for our special expanded perlite which can be expanded from the above-referenced overall perlite ore specifications are:

TABLE 4

| U.S. Standard Sieve No. | Cumulative and Minimum % | Retained Maximum % | Typical |
|---|---|---|---|
| 30 (.6 mm) | 0 | 22 | 11 |
| 50 (.3 mm) | 45 | 75 | 63 |
| 100 (.15 mm) | 90 | 100 | 93 |

When used in concrete structural formulations, the perlite ore is expanded to a predetermined uncompacted bulk density of between 8 and 15 pounds per cubic foot at temperatures between the range of 1400° F. and 2000° F. or 128 to 240 kilograms per cubic meter at 760° to 1093° C. When used in fireproofing compositions in accordance with copending patent application Ser. No. 07/418,326, the uncompacted bulk density can be as low as 3 pounds per cubic foot or 48 kilograms per cubic meter. After expansion, the perlite should be of such particle sizes that at least 78% by weight will pass through a U.S. Standard Sieve No. 30, and 45% by weight will be retained by a U.S. Standard Sieve No. 50. While sieve analysis is important to the formulation of a product in accordance with our invention, the rounded shape and smooth surface characteristics of the perlite must also be present in order to obtain the performance discussed herein.

There should be not more than about 10% fines in the expanded perlite by weight. A fine is a small particle which will at least pass through a U.S. Standard Sieve No. 100. The constant is that the fines are generally unexpanded or incompletely expanded perlite ore, are heavy, and are not economical.

The expanded perlite for use in our invention is not run through screens in order to control its size. The particle sizes are controlled by adjustment of the furnace conditions and from the particles sizes of the ore prior to expansion.

One measure of the hardness and lack of friability of the expanded perlite used in this invention is to make up a mixture of cement, perlite and water and then calculate the specific gravity of the perlite and its void volume within the mixture. The expanded perlite used in this invention, when mixed with cement and water, has a specific gravity in the order of 0.37 and a void volume in the order of 60%. The prior art open-surfaced, expanded perlite has a specific gravity in the order of 0.71 and a void volume in the order of 80%.

The perlite ore is first milled and then sized or graded to the specifications of Table 2, and then is expanded in a vertical furnace or expander, which apparatus and process are known in the art. The perlite ore is fed into an open tall flame (such flame being ignited in the furnace by mixing gas and air), so as to fall toward a burner against an upward draft of air created by a burner blower. The perlite furnace is virtually airtight, and consequently has a strong suction or negative air pressure. This negative air pressure creates the draft that pulls the expanded perlite ore away from the flame and out of the furnace. The perlite particles expand until they reach a loose weight or density that is low enough for the upward draft to carry them out of the top of the expander. In preparing perlite ore for use in our invention, any preheating step should be by-passed, as the preheating process tends to dehydrate and unevenly heat the ore particles, resulting in an unacceptable amount of unexpanded fine ore in the finished expanded product. The ore should be fed directly into the flame by locating the feedport at a low position on the furnace wall. The flame should be adjusted down low from the normal tall position. This low flame is accomplished by premixing the air and gas to the extent that the flame is actually burning in the gas/air pipe outside the furnace burner. At this point, the flame is lower than normal. At the same time, the draft must be adjusted down so the fine ore is pulled through the flame slowly and the resulting expanded perlite is pulled up and out of the furnace. By adjusting the draft and the flame downwardly as described, the density of the expanded perlite will increase and the surface of the particles will be generally rounded, as shown in FIGS. 2A and 2B. The bulk density of the perlite can be controlled by the speed with which it is fed through the flame. A faster speed through the flame results in denser perlite. There is a considerable variation in the size and structure of expanders. Persons skilled in the art will be able to produce suitable expanded perlite with a little testing and experimentation. Furnaces used to make vermiculite may be used to make the expanded perlite of our invention.

The range for the smooth-surfaced, expanded perlite is 0.5 to 20 percent by weight of the wet concrete mix. The cement may be any type of Portland cement or a blended cement. A blended cement is a hydraulic cement consisting essentially of an intimate and uniform blend of granulated blast furnace slag and hydrated lime or an intimate and uniform blend of Portland cement, blast furnace slag or pozzolan, or both, produced by intergrinding Portland cement clinker with the other materials or blending them together or both intergrinding and blending them together. One blended cement is PYRAMENT, sold by Lone Star Industries, Inc., of Stamford, Conn. PYRAMENT is described in U.S. Pat. No. 4,842,649.

In addition to the smooth-surfaced perlite and cement, a suitable finely divided pozzolan, such as undensified microsilica or diatomaceous earth (diatomite) or mixtures thereof, may be added to the concrete. In most applications, about 0.3 to 12 percent by weight of finely divided pozzolan is added to the wet concrete mixture.

Suitable undensified microsilica or fumed amorphous silica can be obtained from Elkem Materials of Pittsburgh, Penna. The microsilica is finely divided amorphous silica and should contain at least 50% by weight of silicon dioxide. This microsilica is a byproduct in the manufacture of ferroalloys.

The microsilica is hydrophobic and, as such, has a high water demand when introduced into a concrete mix. A cement paste containing microsilica is stiff, sticky and unworkable, resulting in a wet concrete composition that is difficult to handle, machine and finish. The high water demand of microsilica can be offset by the use of water reducing agents, as is well known in the art. However, the water reducing agents, while improving the workability of a cement/microsilica paste, usually aggravate stickiness problems. Furthermore, too large a dose of a water reducing agent may reduce the water too much and result in a concrete mix that has an insufficient amount of water for the continued curing of the hardened paste.

Diatomaceous earth is a naturally occurring, friable, earthy material composed of nearly pure, hydrous, amorphous silica and consisting essentially of the frustules of the microscopic plants called "diatoms." One diatomaceous earth product is DIATOMITE D4C, sold by Grefco, Inc., of Los Angeles, Calif. Unlike the undensified microsilica, the diatomaceous earth is hydrophilic and, as such, each pound of diatomite can absorb and mechanically hold in up to two pounds of water. When wet, the diatomaceous earth is slippery. In order to be effective, if diatomaceous earth is used in the pozzolan, it should be used in amounts in excess of 0.15 percent by weight of the concrete composition.

Consequently, the addition of diatomaceous earth to cement and water results in a buttery paste that greatly improves the handling, workability, and finishing qualities of the wet concrete. The water held by the diatomaceous earth is not part of the mixing water and, consequently, is available for the internal curing of the hardened concrete over a long period of time. Diatomaceous earth, or diatomite, thus behaves in a manner similar to microsilica while also improving the plastic and workability qualities of the concrete. Diatomaceous earth virtually eliminates the stickiness associated with the addition of microsilica to concrete. The use of diatomaceous earth in combination with undensified microsilica can obviate the need for high range water reducing agents.

When diatomaceous earth is used in combination with undensified microsilica, the preferable ranges are from one part microsilica to one part diatomaceous earth up to as much as four parts microsilica to one part diatomaceous earth. When diatomaceous earth and microsilica are used together as some of the pozzolan, the preferred ranges are a least 0.15 percent diatomaceous earth and at least 0.3 percent microsilica by weight of the concrete composition.

In some applications, it may also be desirable to add Class C or Class F fly ash, as defined by the American Concrete Institute. Fly ash is the finely divided residue resulting from the combination of ground or powdered coal which is transported through the boiler by flue gases. Fly ash is a pozzolan with a fineness about the same as that of Portland cement, and occurs in the form of very fine, glassy spheres. Fly ash is an amorphous silica and usually contains about 30-40% by weight of silicon dioxide. In this form, fly ash can improve the workability and quality of concrete, as well as be an inexpensive Portland cement substitute. There are indications that the pozzolanic activity of the fly ash can be increased by cracking the glass spheres by means of grinding. However, this may also reduce its lubricating qualities and increase its water requirement.

A finely divided pozzolanic unexpanded or partially expanded perlite ore can be substituted for fly ash. One such perlite ore product is NA 5000 (fines), sold by Grefco, Inc., Los Angeles, Calif. This product should be finely divided with 60-70% of the particles passing a 325 U.S. Standard mesh screen. NA 5000 has a silicon dioxide content in excess of 50% by weight.

The common denominator associating such finely divided mineral pozzolans such as microsilica, diatomaceous earth, and fly ash is their silicon dioxide content which physically and/or chemically combines with the free lime in cement that is released during cement hydration. The individual attributes of adding each of these minerals to concrete is known. However, the combination of these minerals in association with smooth-surfaced, expanded perlite can impart more favorable performance characteristics to concrete than each mineral acting alone.

Preferably, this invention uses mixtures of both undensified microsilica and diatomaceous earth, depending upon cost and availability, in combination with the smooth surfaced perlite. Undensified microsilica, in particular, increases the compressive strength and imparts other advantages to the concrete by improving the bond of the cement paste to the other constituents.

It is contemplated that the product that will be supplied to the concrete manufacturer will be either a predampened or a dry mixture of our smooth-surfaced, expanded perlite, undensified microsilica and diatomaceous earth, or just the smooth-surfaced perlite. All of these products can be added to the cement, water, and aggregate. Fly ash, as well as other natural or synthetic pozzolans (such as hydrated lime, pulverized clays), plasticizers, superplasticizers, and dispersants (such as anionic, cationic, and nonionic surface-active wetting agents) may be included in the above-stated mixed products, may be added separately to the concrete along with the cement, water, and aggregate.

The perlite of our invention does not segregate when a dry blend of it is shipped with undensified microsilica or other pozzolan. The submicronic, undensified microsilica particles attach to and combine with the perlite to form a uniform blend which assures uniform dispersion of the materials in the concrete mix. The angular soft prior art perlite of FIGS. 3A and 3B segregates, and does not stay blended. Homogeneous and uniform blends of our expanded perlite can also be achieved with lightweight aggregates such as expanded shale, clay, pelletized fly ash, and pumice, as long as such aggregates are not too large (not exceeding 1/4 inch or 0.6 cm) and not too heavy (not exceeding 65 pounds per cubic ft. or 1040 kg/m$^3$) or a specific gravity of 2.0.

The above mixtures may comprise ten parts by weight of perlite, from two to fifteen parts by weight of pozzolan, from ten to fifty parts of lightweight aggregate and from two to fifteen parts of water. To any of the above mixtures or to the perlite itself may be added at least one half part of a surface active agent. In order to incorporate water in any of the above mixtures, the water is sprayed or otherwise applied to the mixture as it is being mixed. This is predampening.

What the art calls a dispersant or plasticizer, such as Borem 100 HMP (which is also a surface active agent), may also be added to the mixture in an amount ranging up to about 1 part by weight per 100 parts by weight of the cement. When the perlite is treated with an anionic wetting agent, we can use less dispersant, and may even eliminate the need for a dispersant in some applications. The plasticizer or dispersant aids in the placement and the consolidation of the concrete mixture without changing the ratio of water-to-cement in the mixture.

The aggregate for use in our invention may be any of the available conventionally employed materials such as sand, gravel, slag, expanded shale, and expanded clay. A coarse aggregate is aggregate predominantly retained on a U.S. Standard No. 4 Sieve. A fine aggregate almost entirely passes the No. 4 sieve and is predominantly retained on the No. 200 sieve. We prefer to use a fine aggregate and do not have to use a coarse aggregate. A coarse aggregate should not be used alone, a fine aggregate should be used along with it. The coarse aggregate should not exceed fifty percent by weight of the fine aggregate. If a coarse aggregate is used, we prefer that most of it pass through a ¾ inch (19 mm) sieve. Fly ash and products such as NA 5000 perlite fines may be used to supplement a fine aggregate short of smaller particles. Fibers such as steel, glass or polypropylene may also be added to the concrete mix, and should be considered as both aggregate and secondary reinforcement.

The surface of the expanded perlite is preferably treated with a sealant to prevent the intrusion of water. As a practical matter, however, any effort to seal the surface of the expanded perlite will not seal it completely against water intrusion. This is believed to be an advantage when the concrete mixture finally sets up in that it helps to bond perlite and other ingredients together and aids in the expansion of the perlite. The absorbed water in the expanded perlite is available for the continued internal curing of the concrete. The expanded perlite is thus mildly yet ideally absorptive. The expanded perlite can be pre-dampened when blended with other materials and, as such, eliminates dusting. Furthermore, pre-dampening the perlite allows for faster concrete batching, as well as more consistent and uniform concrete batches.

For use in the high strength concrete compositions with which this invention is primarily concerned, the perlite should preferably be treated with a sealant. For use in other compositions, such as the fireproofing compositions of copending application Ser. No. 07/418,326, the perlite does not have to be treated with a sealant.

One relatively inexpensive way in which to seal the surface of the perlite is to mix it with an ammonium pentaborate solution and then a sodium silicate solution. 25 parts of ammonium pentaborate are dissolved in 225 parts of water at about 60° C. 10 parts of the above ammonium pentaborate solution are mixed in with 100 parts of perlite. The 5 parts of a 55% solids sodium silicate solution are then mixed in with the 100 parts of perlite. A reaction takes place, liberating ammonia gas and substantially sealing the surface of the perlite. Other sealants are a silicone such as LE-743-HS, sold by the Union Carbide Corporation, and Dow Corning 347, sold by the Dow Dorning Corporation. Both LE-743-HS and Dow Corning 347 are concentrated nonionic emulsions of a low viscosity, hydroxy-end-blocked polydimethyl silicone fluid which are diluted with water and sprayed onto, or otherwise applied to, the perlite.

The surface of the perlite may also be treated with a surface-active agent. The surface-active agents are used in small but effective amounts, e.g., in amounts ranging from about 0.01 to 2.0 or 0.1 to 1.0 percent by weight of the perlite, and include the various nonanionic, anionic, and cationic compounds, and preferably the anionic surface-active agents.

The general class of nonionic agents includes the alkylphenyl polyalkoxy alcohols, available commercially under the trademarks IGEPAL and TRITON. Other nonionic surface-active agents include the condensation products of higher fatty alcohols with one or more alkylene oxides, such as ethylene or propylene oxide, or a lower alkyl ether of an alkyl-substituted phenoxyalkoxy lower alcohol. The nonionic surface-active agents include also the condensation products of higher fatty alcohols with alkylene oxides, wherein the fatty alcohols have up to 22 carbon atoms and the alkylene oxide ranges from 50 to 80 percent by weight of the total condensation product. The preferred anionic surface-active agents include the water-soluble, linear, alkyl-substituted aromatic sulfonates having up to eight carbon atoms in the alkyl group, with the acid group being neutralized with an alkali metal or an amine. The anionic water-soluble, surface-active agents include the metal and amine salts of the higher alkylaryl sulfonic acids, such as the alkylbenzene or alkyl-substituted naphthalene sulfonates. Many of these sulfonates are known in the art, and may be found in the text, "Surface Active Agents and Detergents," Vol. II, by Schwartz and Perry, *Interscience Publications, Inc.* (1958), particularly pages 644-646.

Other water-soluble anionic surface-active agents include the alkyl sulfates, such as the higher alkyl sulfates, i.e., the higher fatty acid glyceride sulfates such as sodium lauryl sulfate, the alkali metal tallow sulfates, and the sulfates of the mono and diglycerides of fatty acids. In addition to the sulfonates and sulfate, the succinates are also useful as anionic surface-active agents, and include the dialkyl sulfosuccinates, such as the sodium salt of dihexyl sulfosuccinate, sodium diisobutylalkyl sulfosuccinate, or sodium dimethyl-4-ethyl sulfosuccinate. These surface-active agents may be used alone or in combination, in any relative proportions, to obtain the desired wetting characteristics of the mixture.

In addition to the nonionic and anionic surface-active agents which are preferred for purposes of this invention, some of the cationic surface-active agents may be used. These include the primary aliphatic amines. The amines may be used by themselves or in the formation of various other cationic surface-active agents.

In addition, it was found that the wetting characteristics of the other components, e.g., cement, microsilica, can be improved by using small but effective amounts, i.e., from about 0.01 to 2.0, percent by weight of the cementatious material of at least one anionic surface-active agent selected from the group consisting of the organic sulfonates, sulfates, and succinates.

In these discussions, the term "surface-active agent" is directed to the agent which is applied to or mixed in with the perlite or microsilica or other dry component of the concrete. The term "wetting agent" is directed to an agent which is added to the water or is added to the wet concrete mix.

In prestressed concrete products, it may be found to be desirable to use a high zeta potential colloidal polysilicate agent as an additive, as an alternative to the above. One such agent is Colloidal Concrete Concentrate sold by Colloidal Concrete Technologies, Inc. of Minneapolis, Minn.

The expanded perlite used for purposes of this invention, which may or may not be sealed with a siloxane or other sealant, may then be treated with a hydrophilic surface-active agent. In other words, for purposes of this invention, the expanded perlite may be sealed first with the siloxane and then treated with an anionic, cationic, or nonionic surface-active agent. Preferably, the expanded perlite should be treated with at least one hydrophilic surface-active agent which is either anionic or cationic in character so as to provide the expanded perlite with a negative or positive charge to facilitate dispersion of the said particles in the cementitious composition and prevent adhesion of the particles to each other, which improves the flowability of the mixture.

A key function of the admixture of the expanded perlite, microsilica, diatomaceous earth, and cement is to increase the solid content of the combination with water, which is called paste. We believe that there are bonds or reactions between the expanded perlite, microsilica, diatomaceous earth or other pozzolans and cement which improve the quality of the resulting concrete. In accordance with our invention, the ratio of surface area of solids to the volume of water is increased along with the physical properties of the concrete. In other words, in accordance with our invention, we obtain a paste which has a higher solids content which separately lubricates, coats and bonds to the aggregate to provide a superior concrete. We balance the sizes of the expanded perlite, microsilica, diatomite or other pozzolans, cement and aggregate particles so that the components all interfit with each other and do not leave too many voids.

That the plank stock paste of our invention has a higher solids content than regular plank stock is shown in the creep test. In accordance with this test, 25-foot (7.5 m) long planks of standard plank stock concrete mix and plank stock concrete mix of our invention were tested for creep by being subjected to a sustained load over a 2000-hour period. The standard concrete plank stock had a 52% creep over the initial deflection over a 2000-hour period and the creeping over time had not leveled off. The plank stock of our invention had a greater initial deflection and then, over time, the creep leveled off. The plank stock of our invention had 27% creep over the initial deflection over a 2000-hour period. It is generally accepted that the bulk of time-dependent creep on deformation which occurs in concrete is confined to the paste and the aggregate paste interface. Creep is defined as the time-dependent deformation of concrete plank due to sustained load after initial deflection.

The concrete of our invention is structural concrete with a minimum compressive strength of 2000 psi or 13.8 MPa. Because of the perlite, it may have a relatively low density for a structural concrete and a relatively high compressive strength. It has a superior bond to steel reinforcing strands. It expands slightly as it sets up or hardens, which is an advantage and may help with the bond to reinforcing strands.

We believe that the perlite expands slightly within the concrete during the initial setting or hardening phase of the concrete. We believe that the diatomaceous earth corrects the tendency of the cement to change in volume after setting. In other words, the diatomaceous earth prevents the cement paste from shrinking after the perlite induces expansion. The diatomite particles are irregular and three-dimensional in shape, with one dimension always being far greater than the others. We believe that these irregular diatomite particles, intertwined in the concrete mix, promote higher tensile strength. These rough, irregular particles will also improve the adhesion and bonding quality of the concrete. The diatomaceous earth may also cause some expansion of the concrete while setting because it absorbs and mechanically holds water in a manner similar to the perlite.

The concrete mixture of our invention can be formulated to any desired slump characteristics. For the planks shown in FIG. 1, it should e zero to low slump. The concrete of our invention can be formulated to have low density and relatively high strength characteristics. In such case, and depending on the desired results, we can (i) add only our expanded perlite, (ii) add a mixture of our expanded perlite and water reducing agents, or (iii) add amixture of our expanded perlite and pozzolans, singularly or in combination, as previously described herein.

The following example illustrates the advantages of the cementitious composition of this invention as it relates to the manufacture of zero to low slump, lightweight concrete for plank stock.

EXAMPLE I

Grefco NA-67 (fines) perlite ore was expanded to a compacted bulk density of about 9.8 pounds per cubic foot (157 kg/m$^3$). The expanded perlite matched the specifications stated herein and was rounded and smooth-surfaced as shown in the photomicrographs of FIGS. 2A and 2B. The surface of the perlite was untreated.

An LMT cementitious mixture of expanded perlite, dry undensified microsilica, dry Borem 100 superplasticizer and Portland Cement was made-up and mixed with a fine aggregate (sand) and a coarse aggregate (expanded shale) and water to form approximately one cubic yard of concrete as follows:

|  | Lbs. | Kgs. | Percent |
|---|---|---|---|
| Cement | 800 | 360 | 28.00 |
| Smooth-surfaced, expanded Perlite | 140 | 63 | 5.00 |
| Undensified microsilica | 32 | 14 | 1.10 |
| Borem 100 HMP | 4 | 1.8 | 0.15 |
| Sand | 600 | 270 | 21.28 |
| Expanded shale (Haydite) | 870 | 392 | 31.00 |
| Water | 374 | 168 | 13.25 |
| TOTAL | 2,820 | 1268.8 | 99.78 |

A standard plank concrete HWT mix was made-up as follows:

|  | Lbs. | Kgs. | Percent |
|---|---|---|---|
| Cement | 800 | 360 | 18.9 |
| Sand | 2,800 | 1,260 | 66.25 |
| Pea Gravel | 400 | 180 | 9.5 |
| Water | 225 | 101 | 5.3 |
| TOTAL | 4,225 | 1,901 | 99.95 |

The comparative physical characteristics of the two plank stock concretes were measured as follows:

|  | HWT Standard Concrete | Lightweight Expanded Perlite Microsilica LWT Mix |
|---|---|---|
| Wet Density, Lbs./ft$^3$ (Kgs./m$^3$) | 151 (2416) | 103 (1648) |
| Dry Density, Lbs./ft$^3$ (Kgs./m$^3$) | 145 (2320) | 97 (1552) |
| Weight per panel (25 ft.) Lbs - ((7.7 m) Kgs.) | 5830 (2623) | 3630 (1633) |
| One-day compressive strength, psi (MPa) | 3500 (24.13) | 4950 (34.13) |
| Compressive strength, psi (MPa) (after 28 days) | 6180 (42.62) | 6650 (45.86) |

As shown, the concrete mixture of the present invention is stronger and lighter in comparison to the standard plank stock concrete. The one-day compressive strength is a standard measurement performed on plank stock. The plank stock has to have a compressive strength of at least 3000 psi or 21 MPa before it can cut into predetermined lengths or sections. What the above data particularly shows is that the concrete mixture of the present invention has better one-day compressive strength than regular plank stock.

In the above formulation, expanded shale (Haydite) was used as the coarse aggregate in place of pea gravel in order to make the concrete lighter. Haydite is manufactured by the Hydraulic Press Brick Company of Cleveland, Ohio.

Borem 100 HMP is an aionic polymeric dispersant which places a strong negative charge on the particles in solution. The strong charge causes the particles to repel one another and release the bound water normally trapped in the agglomerated particles. By releasing the bound and trapped water, the dispersant, e.g., Borem 100, causes the viscosity of the concrete paste to drop, allowing for higher solids and a smoother, easier-to-handle mix. For this reason, the dispersant is also called a superplasticizer. Borem 100 HMP is sold by Borden & Remington Corp., of Fall River, Mass.

Figure 4:
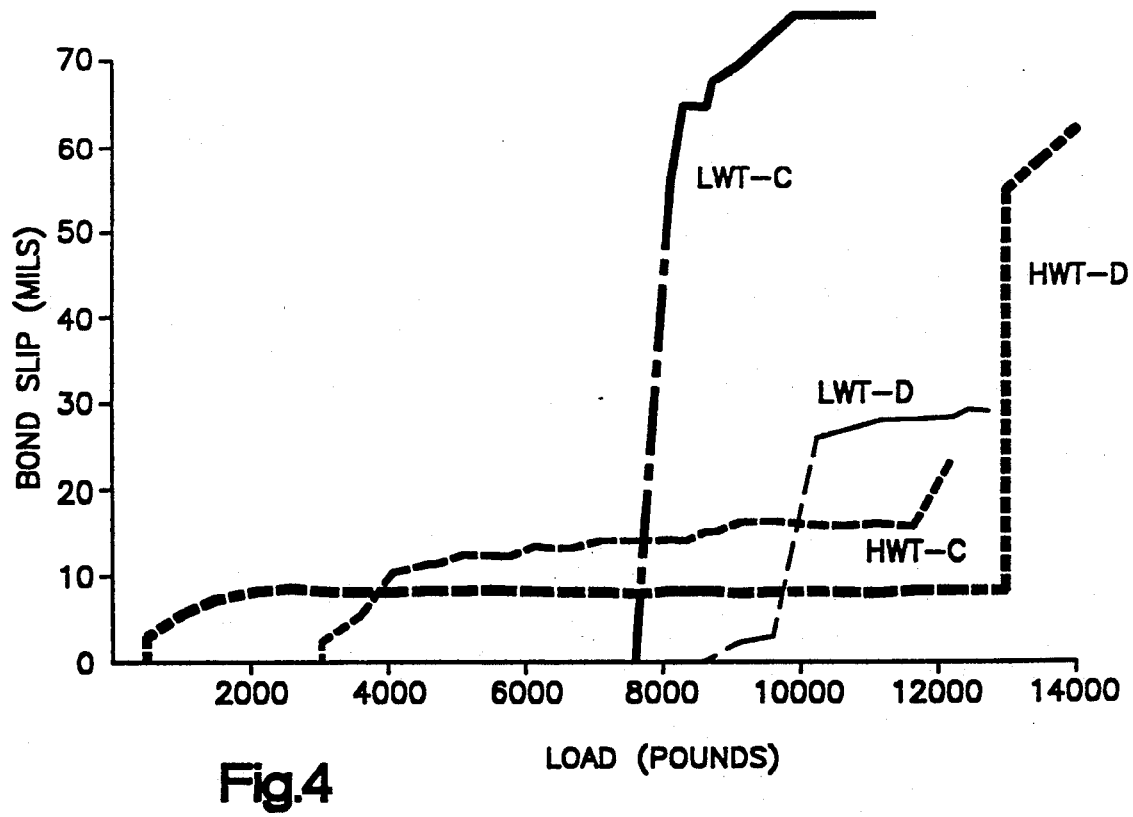
FIG. 4 is a graph of full-scale plant test data comparing the slippage of reinforcing strands in regular plank stock concrete and lightweight plank stock concrete made in accordance with this invention.

In a further test of the bond between the reinforcing strands and the concrete, two ten-foot (3 m) lengths of plank made with the above-standard concrete mix were tested against two ten-foot lengths of plank made with the above lightweight mix. The planks were supported at each end and a force applied about twelve (0.3 m) inches from the edge of one support. A depth gauge was applied to the end of a strand and the slippage measured. This is called a "shear and bond test." As shown in FIG. 4, the first standard weight plank (HWT-C) began to slip or debond at about 500 pounds (225 kgs.) of load and the second one (HWT-D) begin to slip at about 3000 pounds (1350 kgs.) of load. The first lightweight plank (LWT-C) began to slip at about 7000 pounds (3375 kgs.) of load and the second one (LWT-D) began to slip at about 8500 pounds (3825 kgs.) of load.

As shown by the shear and bond test of FIG. 4, the bond between the concrete and the strands in the lightweight plank stock of this invention was clearly superior to the bond in the standard concrete plank stock mixture.

EXAMPLE II

The following example illustrates another high performance, zero slump concrete six formulated with a cementitious composition of this invention, as described above. Grefco NA-66 ore was expanded to an uncompacted bulk density of 9.7 lbs/ft$^3$ (155 Kgs./m$^3$). The perlite was treated with LE-743-HS silicone sealant. The mix can also be used to make plank stock. The mix is set out below.

|  | Lbs. | Kgs. | Percent |
| --- | --- | --- | --- |
| Portland Cement, Type 1 | 600 | 270 | 17.01 |
| Fine "concrete sand" aggregate | 2260 | 1017 | 64 |
| Haydite "expanded shale" aggregate | 207 | 93 | 5.87 |
| Smooth-surfaced expanded perlite | 65 | 29 | 1.84 |
| Undensified microsilica (90% min. silicon dioxide) | 27 | 12 | .76 |
| Natural diatomaceous earth (90% min. silicon dioxide) | 10 | 4.5 | .20 |
| Fly Ash | 30 | 13.5 | .80 |
| Water | 328 | 147.6 | 9.29 |
| TOTAL | 3527 | 1586.6 | 99.77 |

The wet density of the above concrete mix was 132 pounds per cubic foot (2112 kgs/m$^3$). The respective average compressive strengths of four 4"×8" cylinders made from this concrete were:

| Compressive Strength | @ 20 hours - 5450 psi - (37.59 MPa) |
| --- | --- |
|  | @ 20 hours - 5800 psi - (40.00 MPa) |
| Compressive Strength | @ 28 days - 6720 psi - (46.34 MPa) |
|  | @ 28 days - 7006 psi - (48.31 MPa) |

In the preparation and mixing of the above concrete six, the smooth-surfaced, expanded perlite was pre-dampened and then mixed with the Haydite aggregate, undensified microsilica, diatomaceous earth, and fly ash. This mixture was then added to the cement, fine aggregate (sand), and water.

The mix of Example II above can also be used in the manufacture of pre-cast, prestressed products by wet casting instead of machine casting. In wet casting, the concrete is poured into a mold, and preferably is a slumping concrete. For wet casting, there should be approximately 400 pounds (180 kgs.) of water and 2 to 4 pounds (0.9 to 1.8 kgs.) of a superplasticizer such as Borem 100 HMP.

EXAMPLE III

The following example compares concrete blocks, referred to as the "Intralock Block," made from a standard block mix versus a lightweight mix per our invention.

A standard block mix was made up as follows:

| Intralock Block Standard Mix | Lbs. | Kgs. | Percent |
| --- | --- | --- | --- |
| Cement | 329 | 148 | 9.07 |
| Fine Aggregate | 1,400 | 630 | 38.60 |
| #16 Rock | 1,650 | 742 | 45.50 |
| Plasticizer | 1.62 | .73 | 0.04 |
| Water | 247 | 111 | 6.81 |
| TOTAL | 3,627.62 | 1631.73 | 100.02 |

The plasticizer in the above mixture is Masterbuilders Master Mix 10 Lubrilith, available from Masterbuilders, inc., of Beachwood, Ohio.

A lightweight block mix was made up from the expanded perlite of Example I as follows:

| Lightweight Block Mix | Lbs. | Kgs. | Percent |
| --- | --- | --- | --- |
| Cement | 524 | 236 | 23.74 |
| Smooth-surfaced Expanded Perlite | 140 | 63 | 6.34 |
| Undensified Microsilica | 27 | 12 | 1.22 |
| Plasticizer (Borem) | 3 | 1.3 | .14 |
| Expanded Clay (Gravelite) | 1,000 | 450 | 45.31 |
| Fine Aggregate | 243 | 109 | 11.01 |
| Water | 270 | 122 | 12.24 |
| TOTAL | 2,207 | 999.3 | 100.00 |

The perlite was the same as the perlite used in Example I.

The comparative physical characteristics of the two mixes were:

|  | Intralock Regular Mix | Lightweight Mix |
| --- | --- | --- |
| Wet Density, Lbs./ft$^3$ (Kgs./m$^3$) | 135.3 (2165) | 87.5 (1400) |
| Dry Density, Lbs./ft$^3$ (Kgs./m$^3$) | 133.3 (2132) | 79.0 (1264) |
| Dry, Lbs./Block (Kgs./Block) | 52.0 (23.4) | 30.80 (13.9) |
| Compressive Strength, psi (MPa) (28 days,) | 3507.0 (24.19) | 3037 (20.94) |

EXAMPLE IV

The following example compares the performance characteristics of a plain Portland cement mix (MIX 1) with two concrete mixes (MIXES 2 and 3) made in accordance with our invention. The perlite was made from Grefco NA-66 ore expanded to an uncompacted density of 14.5 lbs/ft$^3$ (232 Kgs./m$^3$). The perlite was treated with LE-743-HS silicone sealant. In particular, this example illustrates the superior characteristics of MIXES 2 and 3 over MIX 1 with respect to weight, compressive strength, modulus of elasticity, and flexural bond strength. In the flexural bond strength tests, MIXES 2 and 3 demonstrate that the concrete mixes per this invention exhibit a bonding capacity to reinforcing strands that was as much as 12 times greater than that of the plain Portland cement mix (MIX 1).

cm) and the reinforcing strands did not slip at all. After 24 hours, the load was removed and the plank returned to within three inches of its original pre-load position within the unloading period. Within 28 days, the plank returned to its original cambered position.

Concrete compositions can be used for casting lightweight architectural elements, such as lintels, which comprise only cement, smooth-surfaced, expanded perlite, and water.

The following example illustrates one such composition.

|  | MIX 1 | | | MIX 2 | | | MIX 3 | | |
|---|---|---|---|---|---|---|---|---|---|
|  | Lbs. | Kgs. | Percent | Lbs. | Kgs. | Percent | Lbs. | Kgs. | Percent |
| Type I Portland Cement | 800 | 360 | 18 | 750 | 337 | 23 | 750 | 337 | 23 |
| Fine "concrete sand" | 2800 | 1260 | 64 | 2000 | 900 | 62 | 2000 | 900 | 62 |
| Coarse Aggregate | 400 | 180 | 9 | none | none |  | none | none |  |
| Smooth-surfaced Perlite | none |  |  | 50 | 22.5 | 1.6 | 50 | 22.5 | 1.6 |
| Undensified Microsilica | none |  |  | 50 | 22.5 | 1.6 | 35 | 15.8 | 1.1 |
| Borem 100 Superplasticizer | none |  |  | 3 | 1.4 | .09 | none |  |  |
| Natural Diatomaceous Earth | none |  |  | none |  |  | 20 | 9 | .6 |
| Water | 367 | 165 | 8.4 | 347 | 156 | 10.8 | 346 | 156 | 11 |
| TOTAL | 4367 | 1965 | 99.4 | 3200 | 1439.4 | 99.09 | 3201 | 1440.3 | 99.3 |
| Wet Density Lbs./ft$^3$ (Kgs/m$^3$) | 153 | (2448) |  | 135.5 | (2168) |  | 133.4 | (2134) |  |
| Dry Density Lbs./ft$^3$ (Kgs/m$^3$) | 148 | (2368) |  | 128.5 | (2056) |  | 127.2 | (2035) |  |
| COMPRESSIVE STRENGTHS psi (MPa) |  |  |  |  |  |  |  |  |  |
| 1 day | 3726 | (25.7) |  | 5043 | (34.8) |  | 4410 | (30.4) |  |
| 28 days | 6950 | (47.9) |  | 8080 | (55.7) |  | 8400 | (57.9) |  |
| STATIC MODULUS OF ELASTICITY (psi × 10$^6$) 28 days | 3.87 |  |  | 3.89 |  |  | 3.93 |  |  |
| FLEXURAL BOND STRESS psi | 65 |  |  | 798 |  |  | 773 |  |  |

In the above example, it is important to compare MIX 2 and MIX 3. In MIX 2, and in accordance with our invention, our smooth-surfaced, expanded perlite was preblended with undensified microsilica and a superplasticizer (Borem 100). In MIX 3, and in accordance with our invention, our smooth-surfaced, expanded perlite was pre-blended with a lesser amount of undensified microsilica and diatomaceous earth. In MIX 3, there was no need for a superplasticizer in order to achieve equal or better performance characteristics in the final concrete product. There was no difference in the amount of water used in either MIX 2 or MIX 3 to achieve the same sump and workability.

The flexural bond or pull-out test is a test in which the stress between the concrete and the tendon which results from the application of an external load is measured. Specimens are made up and strands are embedded in the concrete with portions sticking out. The strands are pulled out.

EXAMPLE V

We have found that planks made from mixtures made in accordance with our invention have exceptional flexibility. We believe that the exceptional bond, as described above, allows this exceptional flexibility. A plank was made from a mixture like that of Example II except that it did not have any Haydite. The plank was loaded to 100 percent of its ultimate designed capacity. Under this load, it deflected 12 to 13 inches (30 to 33

EXAMPLE VI

Grefco NA-67 perlite ore was expanded to a compacted bulk density of about 9.17 pounds per cubic foot (147 Kgs/m$^3$). The expanded perlite matched the specifications stated herein and was rounded and had a relatively smooth surface, as shown in the photomicrographs of FIGS. 2A and 2B. The smooth-surfaced, expanded perlite was then spray-treated with an LE-743-HS silicone emulsion. A wet cementitious mixture of the above-stated expanded perlite, Portland cement, and water was made up and tested as follows:

|  | LBS. | KGS. | PERCENT |
|---|---|---|---|
| Cement | 94 | 42.3 | 60.65 |
| Smooth-surfaced, expanded perlite | 16 | 7.2 | 10.30 |
| Water | 45 | 20.2 | 29.03 |
| TOTAL | 155 | 69.9 | 99.98 |
| Volume, ft$^3$ (m$^3$) | 1.9 | (.053) |  |
| Wet Density, Lbs./ft$^3$ (kgs./m$^3$) | 80.9 | (1294) |  |
| Oven Dry Density, Lbs./ft$^3$ (kgs./m$^3$) | 69.7 | (1115) |  |
| Specific Gravity, Perlite | 0.357 |  |  |
| Compressive Strength, psi (MPa) (28 days) | 3360 | (23.17) |  |

The above example shows the unusual combination of high compressive strength and light weight which can be obtained in the use of our invention with only cement, perlite, and water.

In accordance with our invention, when we refer to the concrete mixture wet mix, we mean the mixture used for casting plank stock or concrete blocks or other products, right after mixing with water and other ingredients, before it has set-up or hardened. When the concrete mixture sets up, perhaps 40 percent by weight of the water evaporates or is lost in the setting up process. This is to the "as is" product condition, not a constant weight oven dry condition.

The concrete composition of our invention thus comprises, percent by weight of the wet mix:
8 to 65 percent cement
0.5 to 20 percent smooth-surfaced, expanded perlite
5 to 30 percent water
0 to 12 percent of a pozzolan such as undensified microsilica, diatomaceous earth, and/or fly ash
0 to 75 percent fine aggregate
0 to 5 percent coarse aggregate.

The above ranges comprehend our invention in its broadest aspects. When employed in concrete blocks, the compressive strength can be as low as 2000 psi (13 MPa), and the weight can be as low as 58 pounds per cubic foot (928 Kilograms per cubic meter) oven dry density. For concrete blocks, the compressive strength is preferably at least 2500 psi (17 MPa). When employed in precast, prestressed products, the compressive strength has to be at least 4000 psi (27 MPa), and preferably 6000 psi (41 MPa), and the weight should be at least 75 pounds per cubic foot (1200 Kilograms per cubic meter). With concrete block mixtures, the cement can be as low as 8 percent by weight of the wet concrete mixture. With plank stock mixtures, the cement should be at least 10 percent of the wet concrete mixture, and preferably 12 percent or more. The top oven dry density of our high strength concrete is about 135 pounds per cubic foot (2160 Kilograms per cubic meter).

The preferable ranges for the precast, prestressed product wet mixtures are:
10 to 50 percent by weight cement
0.5 to 15 percent by weight perlite
5 to 35 percent by weight water
0.3 to 10 percent by weight pozzolan
0 to 1 percent by weight of plasticizer
10 to 70 percent by weight fine aggregate
0 to 50 percent by weight coarse aggregate The oven dry density should be from 75 to 135 pounds per cubic foot (1200 to 2160 Kilograms per cubic meter) and the compressive strength should be at least 5000 psi (34 MPa) after 28 days. For reinforced precast but not prestressed products, the minimum compressive strength is about 4000 psi (27 (MPa).

The preferable ranges for the concrete block mixture are:
8 to 50 percent by weight cement
1 to 18 percent by weight perlite
5 to 30 percent by weight water
0.3 to 12 percent by weight pozzolan
0 to 1 percent by weight of plasticizer or superplasticizer
0 to 70 percent by weight fine aggregate
0 to 50 percent by weight coarse aggregate The oven dry density should be from 58 to 115 pounds per cubic foot (928 to 1840 Kilograms per cubic meter) and the compressive strength should be at least (2000 psi (13 MPa) after 28 days.

The concrete of our invention can be used to make precast, prestressed products which are cast from a machine, such as plank stock and spun pilings. It can be wet cast into molds at the job site or poured into molds to make precast, prestressed plank stock, sewer pipe and other precast, prestressed products. It can be wet cast and post-tensioned to make various reinforced products. It can be cast to make cement blocks without reinforcement.

Because of its high bonding strength, the concrete of our invention can be used to embed or anchor metal or plastic hardware. It also can be used to shoot or spray concrete mixtures onto reinforcing steel structures, as in tunnels.

While the invention has been shown and described with respect to particular embodiments thereof, the examples are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiment herein described, nor in any other way that is inconsistent with the extent to which the progress in the art has been advanced by the invention.

What is claimed is:

1. A high strength wet mix concrete composition comprising by weight from about
   8 to 65 percent cement,
   0.5 to 20 percent smooth-surfaced, vesicular, expanded perlite, at least about 78 percent by weight of which passes through a U.S. Standard Sieve No. 30 (0.6 mm) and at least about 45 percent by weight of which is retained on a U.S. Standard Sieve No. 50 (0.3 mm),
   5 to 30 percent water,
   0 to 12 percent finely divided pozzolan,
   0 to 70 percent fine aggregate,
   0 to 60 percent coarse aggregate, said concrete composition, after 28 days, having a compressive strength of at least 2000 psi (14 MPa) and an oven dry density of from about 58 to 135 pounds per cubic foot (928 to 2160 kilograms per cubic meter).

2. The concrete composition of claim 1 comprising 0.3 to 12 percent by weight of finely divided pozzolan comprising a mixture of undensified microsilica and diatomaceous earth.

3. The concrete composition of claim 1, in which the surface of the perlite is treated with a sealant to prevent the substantial intrusion of water.

4. The concrete composition of claim 1, in which the surface of the perlite is treated with a surface-active agent.

5. The concrete composition of claim 1, in which the ranges are:
   10 to 50 percent cement,
   0.5 to 15 percent perlite,
   5 to 25 percent water,
   0.3 to 10 percent pozzolan,
   10 to 70 percent fine aggregate,
   0 to 50 percent coarse aggregate, said concrete composition, after 28 days, having a compressive strength of at least 2500 psi (17 MPa).

6. The concrete composition of claim 5 which contains 0.3 to 6 percent undensified microsilica as a pozzolan.

7. The concrete composition of claim 5 which contains 0.15 to 5 percent diatomaceous earth as a pozzolan.

8. The concrete composition of claim 5 which contains at least 0.3 percent undensified microsilica and at least 0.15 percent diatomaceous earth as a pozzolan.

9. A high strength, concrete product cast from a wet concrete mix which is reinforced with steel strands, comprising by weight:
10 to 50 percent cement,
0.5 to 15 percent smooth-surfaced, vesicular, expanded perlite, at least about 78 percent by weight of which passes through a U.S. Standard Sieve No. 30 (0.6 mm) and at least about 45 percent by weight of which is retained on a U.S. Standard Sieve No. 50 (0.3 mm),
5 to 25 percent water,
0.3 to 10 percent finely divided pozzolan,
10 to 70 percent fine aggregate,
0 to 50 percent coarse aggregate, said concrete product, after 28 days, having a compressive strength of at least 4000 psi (27 MPa).

10. The product of claim 9 in which the reinforcement is prestressed and the compressive strength of the concrete product is at least 5000 psi (35 MPa).

11. A concrete product in accordance with claim 9, which is a plank of generally rectangular shape with longitudinal prestressed steel strands in the bottom section thereof, cast from a zero to low slump wet concrete mix.

12. A smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), and at least about 90 percent by weight being retained on a U.S. Standard Sieve No. 100 (0.15 mm).

13. A mixture of ten parts by weight of a smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), at least about 90 percent by weight being retained on a U.S. Standard Sieve No. 100 (0.15 mm), and two to fifteen parts by weight of a pozzolan.

14. A mixture of ten parts by weight of a smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), at least about 90 percent by weight being retained on a U.S. Standard Sieve No. 100 (0.15 mm), two to ten parts by weight of water, and two to fifteen parts by weight of a pozzolan.

15. A mixture of ten parts by weight of a smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), at least about 90 percent by weight being retained on a U.S. Standard Sieve No. 100 (0.15 mm), two to fifteen parts by weight of a pozzolan, and ten to fifty parts by weight of a lightweight aggregate.

16. A mixture of ten parts by weight of a smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), at least about 90 percent by weight being retained on a U.S. Standard Sieve No. 100 (0.15 mm), two to fifteen parts by weight of water, two to fifteen parts by weight of a pozzolan, and ten to fifty parts by weight of lightweight aggregate.

17. A mixture of claims 13, 14, 15 or 16 containing at least one-half part by weight of a surface active agent.

18. A mixture of ten parts by weight of a smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), at least about 90 percent by weight being retained on a U.S. Standard Sieve No. 100 (0.15 mm), and at least one-half part by weight of a surface active agent.

19. The perlite of claim 12 which is predampened with up to equal parts by weight of water.

20. A mixture of ten parts by weight of a smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), at least about 90 percent by weight being retained on a U.S. Standard Sieve No. 100 (0.15 mm) and from two to fifteen parts by weight of pozzolan which comprises a mixture of diatomaceous earth and undensified microsilica in the proportions of one to four parts by weight of microsilica for each part of diatomaceous earth.

21. A mixture of ten parts by weight of a smooth-surfaced, vesicular, expanded perlite having an uncompacted bulk density of from 48 to 320 kilograms per cubic meter, at least about 78 percent by weight passing through a U.S. Standard Sieve No. 30 (0.6 mm), at least about 45 percent by weight being retained on a U.S. Standard Sieve No. 50 (0.3 mm), at least about 90 percent by weight being retained on a U.S. Standard Sieve No. 100 (0.15 mm) and from two to fifteen parts by weight of pozzolan which comprises fly ash and a mixture of diatomaceous earth and undensified microsilica in the proportions of one to four parts by weight of microsilica for each part of diatomaceous earth.

* * * * *

UNITED STATES PATENT AND TRADEMARK OFFICE
CERTIFICATE OF CORRECTION

PATENT NO. : 5,114,617
DATED : May 19, 1992
INVENTOR(S) : Smetana et al.

It is certified that error appears in the above-identified patent and that said Letters Patent is hereby corrected as shown below:

Column 5, line 29, "constant" should be -- constraint--.

Column 5, line 35, "particles" should be --particle--.

Column 8, line 15, preceding "may be added" insert --or--.

Column 9, line 35, "Dorning" should be --Corning--.

Column 11, line 55, "e" should be --be--.

Column 12, line 10, "LMT" should be --LWT--.

Column 12, line 59, "be" should be inserted between "can" and "cut".

Column 13, line 1, "aionic" should be --anionic--.

Column 13, line 25, " 7000" should be --7500 --.

Column 13, line 37, "six" should be --mix--.

Column 14, line 1, "six" should be --mix--.

Signed and Sealed this

Seventh Day of September, 1993

Attest:

BRUCE LEHMAN

*Attesting Officer*          *Commissioner of Patents and Trademarks*